United States Patent
Koh et al.

(10) Patent No.: US 11,168,449 B2
(45) Date of Patent: Nov. 9, 2021

(54) METHOD FOR BATCH CASTING HIGH-FLUIDITY HIGH-PERFORMANCE CONCRETE AND LOW-FLUIDITY HIGH-PERFORMANCE CONCRETE

(71) Applicant: KOREA INSTITUTE OF CIVIL ENGINEERING AND BUILDING TECHNOLOGY, Gyeonggi-do (KR)

(72) Inventors: Kyung Taek Koh, Gyeonggi-do (KR); Gum Sung Ryu, Gyeonggi-do (KR); Gi Hong An, Gyeonggi-do (KR); Byung Suk Kim, Gyeonggi-do (KR); Sung Yong Park, Gyeonggi-do (KR)

(73) Assignee: KOREA INSTITUTE OF CIVIL ENGINEERING AND BUILDING TECHNOLOGY, Gyeonggi-Do (KR)

( * ) Notice: Subject to any disclaimer, the term of this patent is extended or adjusted under 35 U.S.C. 154(b) by 11 days.

(21) Appl. No.: 16/649,978

(22) PCT Filed: Dec. 11, 2017

(86) PCT No.: PCT/KR2017/014435
§ 371 (c)(1),
(2) Date: Mar. 23, 2020

(87) PCT Pub. No.: WO2019/088351
PCT Pub. Date: May 9, 2019

(65) Prior Publication Data
US 2020/0263369 A1    Aug. 20, 2020

(30) Foreign Application Priority Data
Nov. 6, 2017   (KR) .................. 10-2017-0146577

(51) Int. Cl.
*E01D 21/00*    (2006.01)
*B28B 23/02*    (2006.01)
(Continued)

(52) U.S. Cl.
CPC .............. *E01D 21/00* (2013.01); *B28B 23/02* (2013.01); *B28C 7/0404* (2013.01); *E01D 2/02* (2013.01);
(Continued)

(58) Field of Classification Search
CPC ......... E01D 21/00; E01D 2/02; E01D 19/125; E01D 2101/24; B28B 23/02; B29C 7/0404
(Continued)

(56) References Cited

U.S. PATENT DOCUMENTS 6,694,690 B2 * 2/2004 Li ............................ E04B 1/68
52/396.04
7,621,995 B2 * 11/2009 Gray .................. C04B 40/0039
106/724
(Continued)

FOREIGN PATENT DOCUMENTS

| JP | H06280391 | 10/1994 |
| JP | H1134030 | 2/1999 |

(Continued)

OTHER PUBLICATIONS

"International Search Report (Form PCT/ISA/210) of PCT/KR2017/014435," dated Aug. 2, 2018, with English translation thereof, pp. 1-4.

*Primary Examiner* — Raymond W Addie
(74) *Attorney, Agent, or Firm* — JCIPRNET (57) ABSTRACT

A method of batch-casting high-fluidity high performance concrete and low-fluidity high performance concrete, wherein the method is capable of batch-casting high-fluidity high performance concrete for forming a girder portion of a bridge and low-fluidity high performance concrete for forming a deck plate portion of the bridge by using a concrete casting apparatus. Accordingly, the construction cost can be
(Continued)

reduced and the construction period can be shortened. In addition, because a cold joint does not occur, durability can be improved, and thus the life of the bridge can be increased.

9 Claims, 5 Drawing Sheets

(51) Int. Cl.
*B28C 7/04* (2006.01)
*E01D 2/02* (2006.01)
*E01D 19/12* (2006.01)
*E01D 101/24* (2006.01)

(52) U.S. Cl.
CPC ........ *E01D 19/125* (2013.01); *E01D 2101/24* (2013.01)

(58) Field of Classification Search
USPC ..... 14/73, 74.5, 77.1, 78; 404/17–31, 72–75
See application file for complete search history.

(56) References Cited

U.S. PATENT DOCUMENTS

| | | | |
|---|---|---|---|
| 8,951,343 B2* | 2/2015 | Sadiq | B82Y 30/00 |
| | | | 106/644 |
| 8,974,598 B2 | 3/2015 | Fonollosa et al. | |
| 9,732,002 B2* | 8/2017 | Byrd | C04B 14/24 |
| 10,118,312 B2 | 11/2018 | Yun | |
| 10,166,697 B2* | 1/2019 | Ciuperca | B28B 7/0032 |
| 10,344,480 B2* | 7/2019 | Azizinamini | E04G 13/04 |
| 10,556,830 B2* | 2/2020 | Byrd | C04B 14/24 |
| 10,744,674 B2* | 8/2020 | Ciuperca | C04B 26/14 |
| 10,759,701 B1* | 9/2020 | Byrd | C04B 28/18 |
| 2017/0240476 A1* | 8/2017 | Baumann | C04B 24/2641 |
| 2019/0382964 A1* | 12/2019 | Smith | E01C 5/005 |
| 2020/0087933 A1* | 3/2020 | Ciuperca | B28B 7/02 |
| 2021/0107177 A1* | 4/2021 | Giles | E04G 11/20 |

FOREIGN PATENT DOCUMENTS

| | | |
|---|---|---|
| JP | 2012007329 | 1/2012 |
| KR | 101074136 | 10/2011 |
| KR | 101598119 | 2/2016 |

* cited by examiner

| TYPE OF MIX | W/B (%) | UNIT QUANTITY(kg/m³) | | | | SUPERPLASTICIZER (B × %) |
|---|---|---|---|---|---|---|
| | | MIXING WATER (W) | BINDER (B) | FINE AGGREGATE | COARSE AGGREGATE | |
| HIGH-FLUIDITY HIGH PERFORMANCE CONCRETE | 35 | 175 | 500 | 788 | 843 | 1.5 |
| LOW-FLUIDITY HIGH PERFORMANCE CONCRETE | 35 | 175 | 500 | 788 | 843 | 0.5 |

| TYPE OF MIX | W/B (%) | UNIT QUANTITY(kg/m³) | | | | SUPERPLASTICIZER (B × %) | THICKENER (B × %) | ADDITIONAL CHEMICAL AGENT (B × %) |
|---|---|---|---|---|---|---|---|---|
| | | MIXING WATER (W) | BINDER (B) | FINE AGGREGATE | COARSE AGGREGATE | | | |
| LOW-FLUIDITY HIGH PERFORMANCE CONCRETE | 35 | 175 | 500 | 788 | 843 | 1.5 | - | - |
| HIGH-FLUIDITY HIGH PERFORMANCE CONCRETE | 35 | 175 | 500 | 788 | 843 | 1.5 | 2 | 0.2 |

REMARKS
- LOW-FLUIDITY HIGH PERFORMANCE CONCRETE: SLUMP FLOW IN RANGE OF 300 TO 500 mm, APPLIED TO DECK PLATE (SLAB) OF BRIDGE THAT HAS SLOPE GRADIENT
- FLUIDITY MAINTAINING TIME AND HYDRATION REACTION TIME OF LOW-FLUIDITY HIGH PERFORMANCE CONCRETE ARE THE SAME AS THOSE OF HIGH-FLUIDITY HIGH PERFORMANCE CONCRETE
- HIGH-FLUIDITY HIGH PERFORMANCE CONCRETE: SLUMP FLOW IN RANGE OF 600 TO 850 mm, APPLIED UP TO GIRDER PORTION OF BRIDGE
- HIGH-FLUIDITY HIGH PERFORMANCE CONCRETE HAS CHARACTERISTIC IN THAT IT FLOWS WHEN PREDETERMINED PRESSURE OR VIBRATION IS APPLIED
- CEMENT IS USED AS BINDER (B)
- MIXING VOLUME OF SUPERPLASTICIZER IS MAINTAINED THE SAME TO SECURE WORKABILITY (AMOUNT OF SUPERPLASTICIZER IS NOT ADJUSTED ACCORDING TO FLUIDITY)
- AS THICKENER, CELLULOSE DERIVATIVE THICKENER, STARCH DERIVATIVE THICKENER, OR SODIUM ALGINATE THICKENER IS USED IN AMOUNT IN RANGE OF 0.005 TO 5 WT% WITH RESPECT TO CEMENT WEIGHT
- AS ADDITIONAL CHEMICAL AGENT, AIR ENTRAINING AGENT (AE AGENT) OR ALGINATE FOAMING AGENT IS USED IN AMOUNT IN RANGE OF 0.001 TO 0.05 WT% WITH RESPECT TO CEMENT WEIGHT

FIG. 5

| TYPE OF MIX | W/B (%) | UNIT QUANTITY (kg/m³) | | | | | | | | SUPERPLASTICIZER (B × %) | THICKENER (B × %) | ADDITIONAL CHEMICAL AGENT (B × %) |
|---|---|---|---|---|---|---|---|---|---|---|---|---|
| | | WATER (W) | BINDER (B) | | | | FINE AGGREGATE | COARSE AGGREGATE | STEEL FIBER | | | |
| | | | CEMENT | SILICA FUME | BS | FA | | | | | | |
| LOW-FLUIDITY ULTRA-HIGH PERFORMANCE CONCRETE | 0.2 OR LESS | 200 | 550 | 98 | 135 | 135 | 230 | 275 | 29 | 26 | - | - |
| HIGH-FLUIDITY ULTRA-HIGH PERFORMANCE CONCRETE | 0.2 OR LESS | 200 | 550 | 98 | 135 | 135 | 230 | 275 | 29 | 26 | 3.5 | 0.33 |

REMARKS
- LOW-FLUIDITY ULTRA-HIGH PERFORMANCE CONCRETE: SLUMP FLOW IN RANGE OF 390 TO 500 mm, APPLIED TO DECK PLATE (SLAB) OF BRIDGE THAT HAS SLOPE GRADIENT
- FLUIDITY MAINTAINING TIME AND HYDRATION REACTION TIME OF LOW-FLUIDITY ULTRA-HIGH PERFORMANCE CONCRETE ARE THE SAME AS THOSE OF HIGH-FLUIDITY ULTRA-HIGH PERFORMANCE CONCRETE
- HIGH-FLUIDITY ULTRA-HIGH PERFORMANCE CONCRETE: SLUMP FLOW IN RANGE OF 600 TO 850 mm, APPLIED UP TO GIRDER PORTION OF BRIDGE
- HIGH-FLUIDITY ULTRA-HIGH PERFORMANCE CONCRETE HAS CHARACTERISTIC IN THAT IT FLOWS WHEN PREDETERMINED PRESSURE OR VIBRATION IS APPLIED
- MIXING VOLUME OF SUPERPLASTICIZER IS MAINTAINED THE SAME TO SECURE WORKABILITY (AMOUNT OF SUPERPLASTICIZER IS NOT ADJUSTED ACCORDING TO FLUIDITY)
- AS THICKENER, CELLULOSE DERIVATIVE THICKENER, STARCH DERIVATIVE THICKENER, OR SODIUM ALGINATE THICKENER IS USED IN AMOUNT IN RANGE OF 0.005 TO 5 WT% WITH RESPECT TO CEMENT WEIGHT
- AS ADDITIONAL CHEMICAL AGENT, AIR ENTRAINING AGENT (AE AGENT) OR ALGINATE FOAMING AGENT IS USED IN AMOUNT IN RANGE OF 0.001 TO 0.05 WT% WITH RESPECT TO CEMENT WEIGHT

METHOD FOR BATCH CASTING HIGH-FLUIDITY HIGH-PERFORMANCE CONCRETE AND LOW-FLUIDITY HIGH-PERFORMANCE CONCRETE

CROSS-REFERENCE TO RELATED APPLICATION

This application is a 371 of international application of PCT application serial no. PCT/KR2017/014435, filed on Dec. 11, 2017, which claims the priority benefit of Korean application no. 10-2017-0146577, filed on Nov. 6, 2017. The entirety of each of the abovementioned patent applications is hereby incorporated by reference herein and made a part of this specification.

TECHNICAL FIELD

The present invention relates to a method of casting high performance concrete, and more particularly, to a method of batch-casting high performance concrete, wherein the method is capable of batch-casting high-fluidity high performance concrete for forming a girder portion of a bridge and low-fluidity high performance concrete for forming a deck plate portion of the bridge that has a slope gradient by using a concrete casting apparatus. Hereinafter, the high performance concrete will be described as including both high performance concrete having a compressive strength in a range of about 40 to 80 MPa and ultra-high performance concrete having a compressive strength in a range of about 80 to 180 MPa.

DESCRIPTION OF RELATED ART

In general concrete bridges, because general concrete with a compressive strength of 40 MPa or lower and a slump of about 100 mm is applied, problems do not occur in terms of concrete casting or the like even in a case in which the concrete is applied to a deck plate or the like of a bridge having a slope gradient.

However, because the general concrete has low durability and thus shortens the life of the bridge, there are problems such as increased maintenance and repair costs for the bridge or requiring frequent bridge replacements.

In recent years, high performance (or ultra-high performance) concrete having a compressive strength in a range of about 80 to 180 MPa has been applied when constructing a bridge. Accordingly, durability is significantly improved and it is possible to significantly increase the life of the bridge. The high performance concrete refers to concrete that has high strength, high durability, and high watertightness in addition to having improved fluidity. Due to having high strength and being cavitated, the high performance concrete may improve constructability. Recently, the high performance concrete has been developed toward self-consolidating concrete.

However, due to having a low water-to-binder ratio and using a large amount of binder, the high performance (or ultra-high performance) concrete has a characteristic of having fluidity that allows it to flow like water by using a large amount of superplasticizer in order to secure constructability. Due to such a characteristic, a structure can be molded by self-compaction even when consolidation is not performed, but it is not easy to implement a shape that the structure requires in a member having a slope gradient.

Also, in order to apply the high performance (or ultra-high performance) concrete to a deck plate or the like of a bridge having a slope gradient, an upper formwork has to be used.

However, in a case in which the upper formwork is used, closed air may be generated and a large amount of foam may be generated on a surface of the concrete. Accordingly, there are problems such as deterioration of appearance and decrease in durability, which in turn cause a decrease of on-site work efficiency and a cost increase.

Meanwhile, flowing concrete is concrete with improved workability by adding a plasticizer to pre-mixed concrete and increasing fluidity for a predetermined time, and examples of the flowing concrete include high-fluidity concrete. In the case of the flowing concrete, the consolidation work is accompanied by side effects such as an increase in cost of construction by manpower, difference in concrete quality according to skill of a worker, delay in construction period, and civil complaints caused by noise in urban construction work.

Accordingly, these days, high-fluidity concrete has been developed and used that has high fluidity and high gap permeability so that consolidation is not required or the concrete is densely compacted in a formwork, in which reinforcing bars and the like are arranged, even when very little consolidation is performed and in which separation of materials does not occur during flowing and required homogeneity is secured. The high-fluidity concrete, which is also referred to as self-compacting type high-fluidity concrete, indicates concrete having extremely high fluidity. Generally, on the basis of slump flow around 600 mm, concrete having higher slump flow is referred to as high-fluidity concrete. Generally, in addition to having the above-described features, the high-fluidity concrete is known to cause reduction in bleeding and shrinkage.

Figure 1:
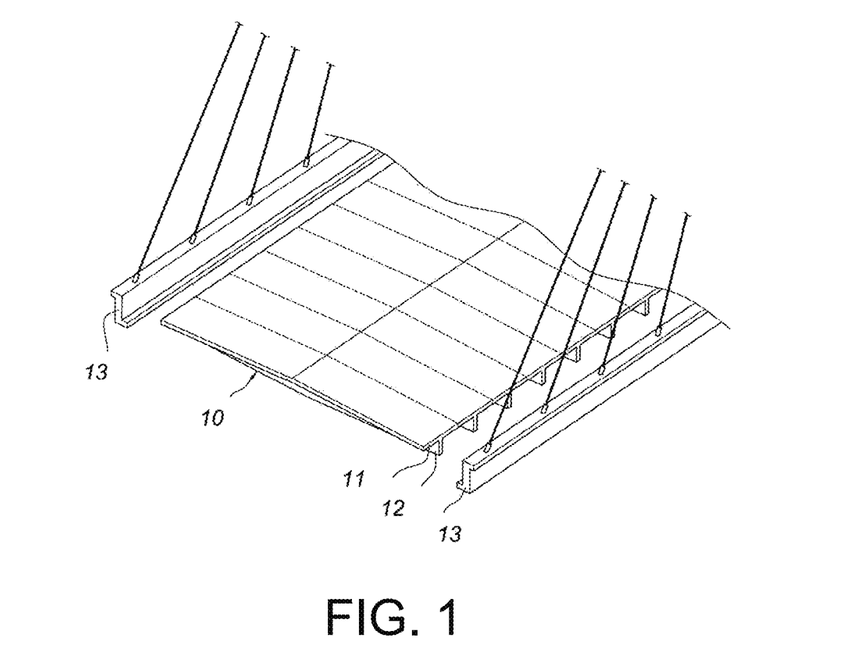
FIG. 1 is a schematic exploded perspective view relating to a portion of a bridge in which an upper structure is formed using a deck plate-cross beam integrated type segment according to related art.
Figure 2:
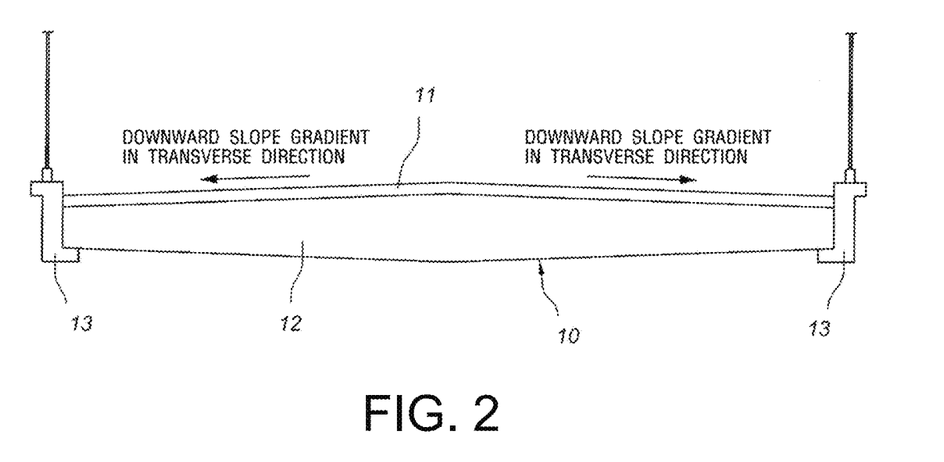
FIG. 2 is a longitudinal front view of the deck plate-cross beam integrated type segment illustrated in FIG. 1.

Meanwhile, FIG. 1 is a schematic exploded perspective view relating to a portion of a bridge in which an upper structure is formed using a deck plate-cross beam integrated type segment according to related art, and FIG. 2 is a longitudinal front view of the deck plate-cross beam integrated type segment illustrated in FIG. 1.

As illustrated in FIG. 1, a horizontal deck plate 11 and a vertical cross beam 12 are formed as one body in a deck plate-cross beam integrated type segment 10 according to the related art, and the deck plate-cross beam integrated type segment 10 is manufactured to have a predetermined width in the longitudinal direction and is disposed in a transverse direction between main girders 13 of the bridge. A plurality of deck plate-cross beam integrated type segments 10 are integrally connected and form an upper structure of the bridge. However, as illustrated in FIG. 2, the deck plate-cross beam integrated type segment 10 has a downward slope gradient in the transverse direction such that a surface thereof is inclined toward both sides with respect to the center line, thereby allowing rainwater or the like to flow toward both sides in the transverse direction.

High performance concrete is used for manufacturing the deck plate-cross beam integrated type segment 10. The high performance concrete has extremely high fluidity. Therefore, when high-fluidity concrete is cast using an open type formwork according to general related art in which an upper surface is open, because the center is raised due to the transverse slope gradients toward both sides, the concrete flows to the left and right, and it is not possible to manufacture the deck plate-cross beam integrated type segment 10 which has a form with a raised center.

Because the ultra-high-performance or high-performance concrete that has extremely high fluidity flows like water, in a state in which an upper surface of a formwork is opened like the open type formwork according to the related art, it is extremely difficult to manufacture a portion protruding toward the upper surface of the concrete structure to a desired shape. Therefore, there is an urgent need for a method of manufacturing a concrete structure in which an upper surface of a concrete member is not flat.

As a related art for addressing the above problems, Korean Patent Registration No. 10-1074136 has disclosed an invention titled "manufacturing method of concrete member using inclined pouring structure" in which, by disposing a formwork having a closed structure in an inclined form and casting high performance concrete that has high fluidity from one side of the formwork, a protruding portion may be easily formed by the inclination of the formwork. However, there is a limitation that a separate closed type formwork has to be manufactured for use.

Meanwhile, in the case of the above-described high-fluidity high performance concrete, because the water-to-binder ratio (W/B) is low and a large amount of binder (B) is used, a large amount of superplasticizer is used in order to secure constructability. Accordingly, the concrete has the characteristic of having fluidity that allows it to flow like water. Due to such characteristics of the high-fluidity high performance concrete, a concrete member can be molded even when consolidation is not performed, but there is a problem in that it is difficult to implement a shape that a concrete member having a slope gradient requires.

In order to address this problem, when casting high performance concrete, the original high-fluidity high performance concrete may be cast up to a girder portion of the bridge, and low-fluidity high performance concrete may be cast on a deck plate portion of the bridge that has a slope gradient. In this case, the high-fluidity high performance concrete is used with a mix proportion adjusted so that slump flow is in a range of about 600 to 850 mm, and the low-fluidity high performance concrete is used with a mix proportion adjusted so that slump flow is in a range of about 300 to 500 mm.

Figure 3:
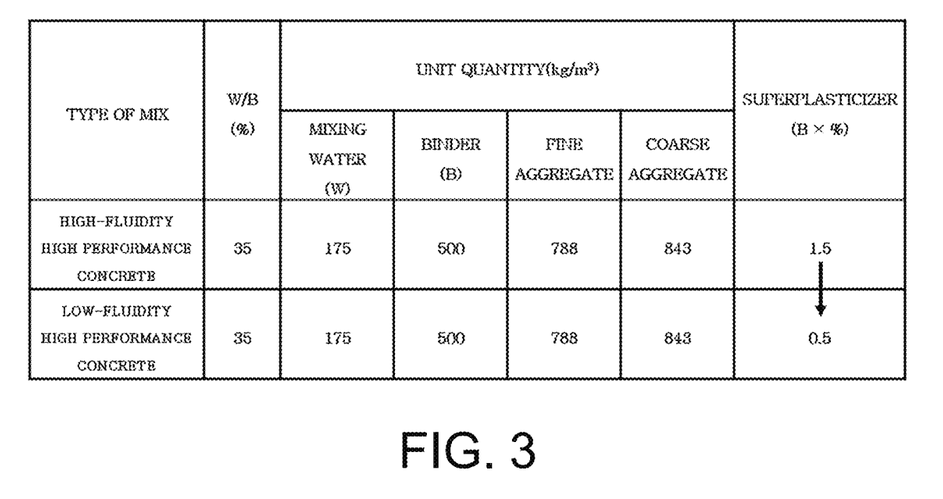
FIG. 3 is a view illustrating mixes of low-fluidity high performance concrete and high-fluidity high performance concrete that have different fluidities according to related art.

In order to easily manufacture the low-fluidity high performance concrete with the slump flow in the range of 300 to 500 mm, when mixing the above-described high-fluidity high performance concrete, the use amount of superplasticizer is reduced as illustrated in FIG. 3.

FIG. 3 is a view illustrating mixes of low-fluidity high performance concrete and high-fluidity high performance concrete that have different fluidities according to related art.

However, regarding the low-fluidity high performance concrete manufactured by the method of reducing the use amount of superplasticizer, it may be difficult to secure a sufficient working time due to a sharp decrease in fluidity, a high injection pressure may be required during casting by pumping, or casting efficiency may be significantly decreased due to a decrease in a casting speed. Thus, the construction cost and construction period may be increased, and, in a case in which a bridge is constructed with the low-fluidity high performance concrete, there is difficulty in manufacturing a concrete member.

Also, in a case in which the above-described batches of concrete having different fluidities are cast individually, there is a problem in that cracks or deformation may occur in a portion of a concrete member at an interface between the batches of concrete due to differences in temperature and shrinkage which are caused by a difference in hydration reaction time.

Technical Problem

The present invention is directed to providing a method of batch-casting high-fluidity high performance concrete and low-fluidity high performance concrete, wherein the method is capable of batch-casting high-fluidity high performance concrete for forming a girder portion of a bridge and low-fluidity high performance concrete for forming a deck plate portion of the bridge that has a slope gradient by using a concrete casting apparatus.

The present invention is also directed to providing a method of batch-casting high-fluidity high performance concrete and low-fluidity high performance concrete, wherein the method is capable of securing workability required for each of the high-fluidity high performance concrete and the low-fluidity high performance concrete by maintaining an amount of superplasticizer the same during the batch-casting of the high-fluidity high performance concrete and the low-fluidity high performance concrete.

Technical Solution

The present invention provides a method of batch-casting high-fluidity high performance concrete and low-fluidity high performance concrete, wherein the method is capable of batch-casting high-fluidity high performance concrete for forming a girder portion of a bridge and low-fluidity high performance concrete for forming a deck plate portion of the bridge that has a slope gradient by using a concrete casting apparatus and capable of securing workability required for each of the high-fluidity high performance concrete and the low-fluidity high performance concrete by maintaining an amount of superplasticizer the same during the batch-casting of the high-fluidity high performance concrete and the low-fluidity high performance concrete.

Advantageous Effects

According to the present invention, a bridge can be batch-cast in a case in which high-fluidity high performance concrete, whose fluidity is adjusted, is cast up to a first concrete member, e.g., a girder portion of the bridge, and low-fluidity high performance concrete is cast on a second concrete member, e.g., a deck plate portion of the bridge that has a slope gradient.

Accordingly, the construction cost can be reduced and the construction period can be shortened. In addition, because a cold joint does not occur, durability can be improved, and thus the life of the bridge can be increased.

According to the present invention, workability required for each of the high-fluidity high performance concrete and the low-fluidity high performance concrete can be secured by maintaining an amount of superplasticizer the same during the batch-casting of the high-fluidity high performance concrete and the low-fluidity high performance concrete.

According to the present invention, by using a cellulose derivative thickener, a starch derivative thickener, or a sodium alginate thickener in a mix of high-fluidity high performance concrete, whose fluidity is adjusted, required workability can be secured, and required slump flow can be controlled with the same hydration reaction time while pumping is not significantly affected.

According to the present invention, by additionally using an air entraining agent (AE agent) or an alginate foaming agent in the mix of the high-fluidity high performance concrete, whose fluidity is adjusted, pumping performance can be improved such that an injection pressure is reduced or an injection speed is increased.

DESCRIPTION OF REFERENCE NUMERALS

110: bridge girder/first concrete member
120: high-fluidity high performance concrete
130: bridge deck plate/second concrete member
140: low-fluidity high performance concrete
150: concrete casting apparatus/concrete mixer truck

[Best Mode of the Invention]

A method of batch-casting high-fluidity high performance concrete and low-fluidity high performance concrete according to the present invention includes: a) installing a formwork and reinforcing bars for a first concrete member on which high-fluidity high performance concrete is to be cast; b) installing a formwork and reinforcing bars for a second concrete member on which low-fluidity high performance concrete is to be cast along a slope gradient; c) mixing binder, mixing water, fine aggregate, coarse aggregate, and superplasticizer into the low-fluidity high performance concrete; d) before casting of the concrete, forming the high-fluidity high performance concrete with adjusted fluidity by using a thickener while a mixing volume of the superplasticizer is maintained the same; e) adding an additional chemical agent to the high-fluidity high performance concrete; and f) batch-casting the low-fluidity high performance concrete and the high-fluidity high performance concrete on respective formworks, wherein the thickener is used in an amount in a range of 0.005 to 5.0 wt % with respect to cement weight, the additional chemical agent is used in an amount in a range of 0.001 to 0.05 wt % with respect to the cement weight, and the low-fluidity high performance concrete is cast so that a fluidity maintaining time and a hydration reaction time are the same as those of the high-fluidity high performance concrete.

[Modes of the Invention]

Hereinafter, exemplary embodiments of the present invention will be described in detail with reference to the accompanying drawings so that those of ordinary skill in the art to which the present invention pertains can easily practice the present invention. However, the present invention may be implemented in various other forms and is not limited to the embodiments described herein. Also, in order to clearly describe the present invention, parts irrelevant to the description have been omitted from the drawings, and like elements are denoted by like reference numerals throughout the specification.

Throughout the specification, when it is said that a certain portion "includes" a certain element, unless clearly described otherwise, this indicates that the certain portion may further include, instead of excluding, another element.

As described above, in the case of high-fluidity high performance concrete because a water-to-binder ratio W/B is low and a large amount of binder B is used, a large amount of superplasticizer is used in order to secure constructability. Accordingly, the high-fluidity high performance concrete has a characteristic of having fluidity that allows it to flow like water. Due to such characteristics of the high-fluidity high performance concrete, a concrete member can be molded even when consolidation is not performed, but it is difficult to implement a shape that a concrete member having a slope gradient requires.

Therefore, a method of casting low-fluidity high performance concrete and high-fluidity high performance concrete that have different fluidities according to an embodiment of the present invention aims to address this problem.

Figure 4:
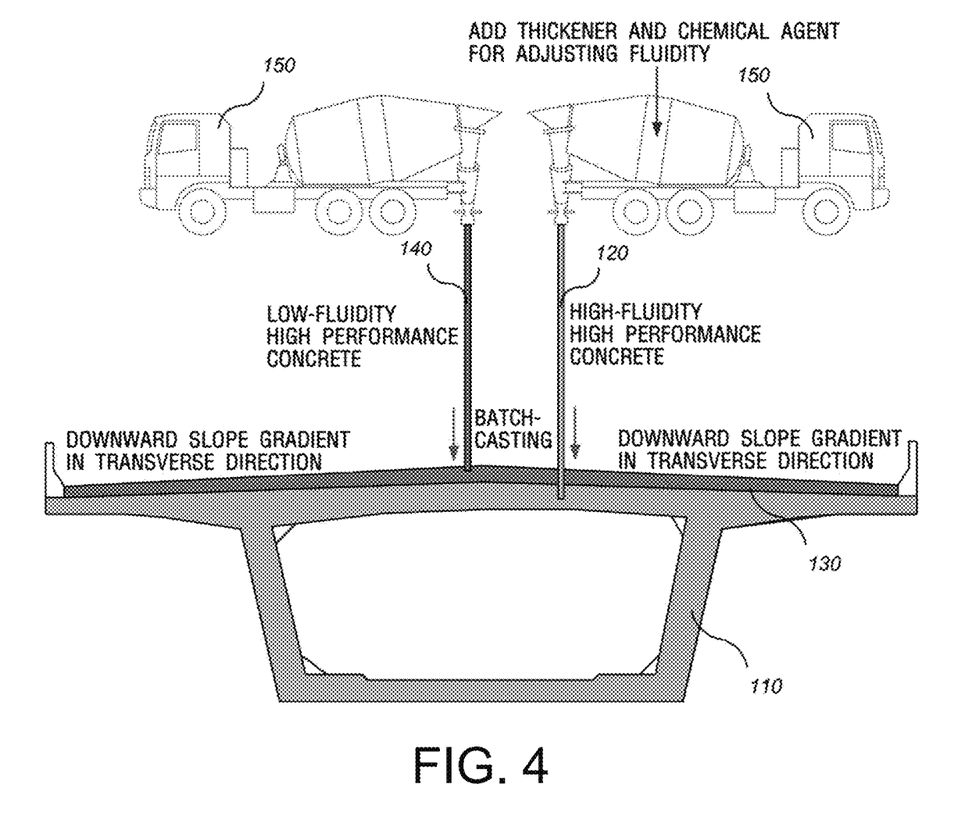
FIG. 4 is a view for schematically describing the concept of casting low-fluidity high performance concrete and high-fluidity high performance concrete that have different fluidities according to an embodiment of the present invention.

FIG. 4 is a view for schematically describing the concept of casting low-fluidity high performance concrete and high-fluidity high performance concrete that have different fluidities according to an embodiment of the present invention.

Referring to FIG. 4, a method of batch-casting the high-fluidity high performance concrete and low-fluidity high performance concrete that have different fluidities according to an embodiment of the present invention is a method of batch-casting a bridge by casting high-fluidity concrete 120 up to a girder 110 right below a deck plate of the bridge and casting low-fluidity concrete 140 on a deck plate 130 portion having a slope gradient by using a concrete casting apparatus 150 in order to apply high performance concrete to a bridge construction site. Here, the high performance concrete will be described as including both high performance concrete having a compressive strength in a range of about 40 to 80 MPa and ultra-high performance concrete having a compressive strength in a range of about 80 to 180 MPa.

The batch-casting refers to, for example, casting the high-fluidity high performance concrete 120 for girder and, before the girder 110 of the bridge is completely cured, casting the low-fluidity high performance concrete 140 on the deck plate 130 of the bridge by using the concrete casting apparatus 150. Accordingly, it is possible to significantly shorten the construction period. In this case, the high-fluidity high performance concrete 120 is used with a mix proportion adjusted so that slump flow is in a range of about 600 to 850 mm, and the low-fluidity high performance concrete 140 is used with a mix proportion adjusted so that slump flow is in a range of about 300 to 500 mm.

Specifically, in the method of batch-casting the high-fluidity high performance concrete and the low-fluidity high performance concrete according to an embodiment of the present invention, even when fluidities of the high-fluidity high performance concrete 120 and the low-fluidity high performance concrete 140 are different, hydration reaction times thereof are adjusted to be the same. In this way, the high-fluidity high performance concrete 120 and the low-fluidity high performance concrete 140 are cast so that shrinkage behaviors thereof during a hydration reaction become the same. That is, it is preferable that the fluidity maintaining time and hydration reaction time of the low-fluidity high performance concrete 140 are adjusted to be similar to the fluidity maintaining time and hydration reaction time of the high-fluidity high performance concrete 120.

In the method of batch-casting the high-fluidity high performance concrete and the low-fluidity high performance concrete according to an embodiment of the present invention, when manufacturing high performance concrete, the high performance concrete is mixed to have low fluidity along a slope gradient of a concrete structure to manufacture the low-fluidity high performance concrete 140, and, when casting on a formwork for girder, the low-fluidity high performance concrete 140 is mixed to have increasing fluidity and cast. That is, when manufacturing high performance concrete, the low-fluidity high performance concrete 140 is formed along a slope gradient, and then, when casting on a formwork for girder, the fluidity is adjusted to form the high-fluidity high performance concrete 120.

Figure 5:
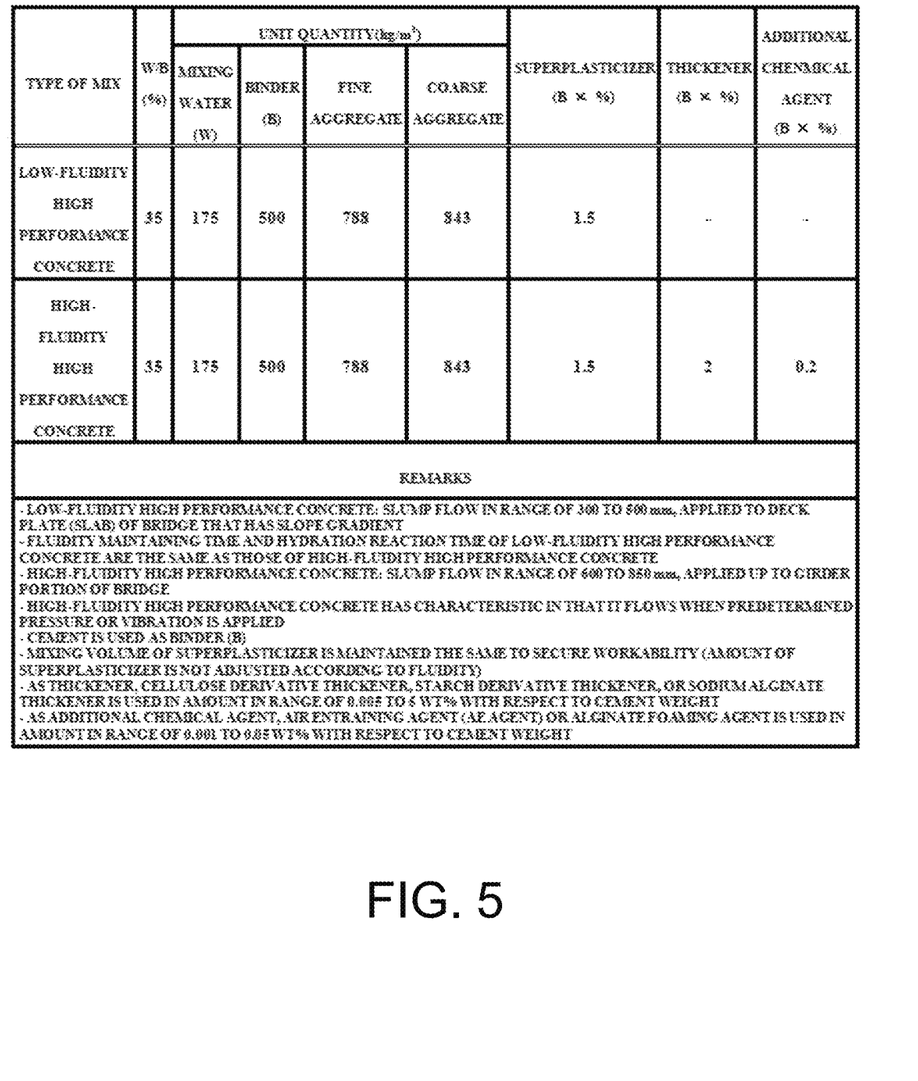
FIG. 5 is a view illustrating mixes of low-fluidity high performance concrete and high-fluidity high performance concrete that have different fluidities according to an embodiment of the present invention.
Figure 6:
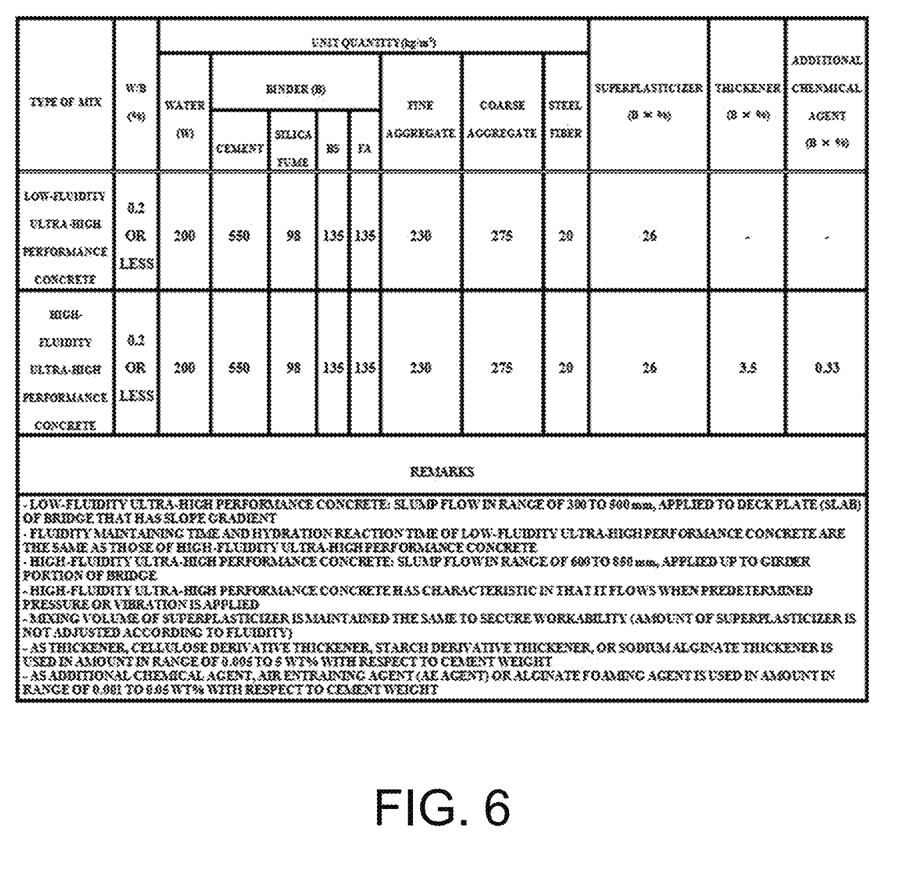
FIG. 6 is a view illustrating mixes of low-fluidity ultra-high performance concrete and high-fluidity ultra-high performance concrete that have different fluidities according to an embodiment of the present invention.

Meanwhile, FIG. 5 is a view illustrating mixes of low-fluidity high performance concrete and high-fluidity high performance concrete that have different fluidities according to an embodiment of the present invention, and FIG. 6 is a view illustrating mixes of low-fluidity ultra-high performance concrete and high-fluidity ultra-high performance concrete that have different fluidities according to an embodiment of the present invention.

As illustrated in FIG. 5, the low-fluidity high performance concrete and the high-fluidity high performance concrete that have different fluidities according to an embodiment of the present invention are batches of high performance concrete having a compressive strength in a range of about 40 to 80 MPa, each of which is mixed in a water-to-binder ratio W/B of 0.35 and includes water W, which is mixing water, binder B, fine aggregate, coarse aggregate, and superplasticizer. The low-fluidity high performance concrete and the high-fluidity high performance concrete each include the same amount of superplasticizer, and the above-described thickener and additional chemical agent are mixed with the low-fluidity high performance concrete to form the high-fluidity high performance concrete. That is, in the low-fluidity high performance concrete and the high-fluidity high performance concrete, the amount of superplasticizer is not adjusted according to fluidity.

As illustrated in FIG. 6, the low-fluidity ultra-high performance concrete and high-fluidity ultra-high performance concrete that have different fluidities according to an embodiment of the present invention are batches of ultra-high performance concrete having a compressing strength in a range of about 80 to 180 MPa, each of which is mixed in a water-to-binder ratio W/B of 0.2 or less and includes water W, which is mixing water, cement, which is binder B, silica fume, blast-furnace slag fine powder, fly ash, fine aggregate, coarse aggregate, and superplasticizer. The binder B may include cement, silica fume, blast-furnace slag fine powder, and fly ash. In this case, the low-fluidity ultra-high performance concrete and the high-fluidity ultra-high performance concrete each include the same amount of superplasticizer, and the above-described thickener and additional chemical agent are mixed with the low-fluidity ultra-high performance concrete to form the high-fluidity ultra-high performance concrete. That is, in the low-fluidity ultra-high performance concrete and the high-fluidity ultra-high performance concrete, the amount of superplasticizer is not adjusted according to fluidity.

It should be self-evident to those of ordinary skill in the art that the above-described mixes of the low-fluidity high performance concrete and the high-fluidity high performance concrete, which have different fluidities, illustrated in FIG. 5 and mixes of the low-fluidity ultra-high performance concrete and the high-fluidity ultra-high performance concrete, which have different fluidities, illustrated in FIG. 6 are merely illustrative and the present invention is not limited thereto.

Specifically, in the method of batch-casting the high-fluidity high performance concrete and the low-fluidity high performance concrete according to an embodiment of the present invention, it is preferable that the amounts of superplasticizer mixed in the batches of high performance concrete 120 and 140 are the same regardless of the fluidities of the high-fluidity high performance concrete 120 and the low-fluidity high performance concrete 140 so that workability is secured, and then, during casting, a chemical agent capable of adjusting fluidity is additionally used regardless of slope gradient.

More specifically, in order to adjust fluidity, when forming the high-fluidity high performance concrete 120, a cellulose derivative thickener, a starch derivative thickener, or a sodium alginate thickener is used in an amount in a range of 0.005 to 5.0 wt % with respect to cement weight according to required fluidity, and an air entraining agent (AE agent) or an alginate foaming agent is additionally used in an amount in a range of 0.001 to 0.05 wt % with respect to the cement weight.

In such a case, the high performance concrete has a characteristic in that it does not flow while a concrete mixer truck, which is the concrete casting apparatus 150, is standstill or not vibrating and flows when the concrete mixer truck applies a predetermined pressure or vibration.

For example, the thickener may be a cellulose derivative thickener, a starch derivative thickener, or a sodium alginate thickener, and, in a case in which the thickener is added to the low-fluidity high performance concrete 140 to form the high-fluidity high performance concrete 120, the fluidity may be kept low while the concrete mixer truck is standstill or not vibrating, and the fluidity maintaining time and hydration reaction time of the low-fluidity high performance concrete 140 may be maintained the same as those of the original high-fluidity high performance concrete 120. Accordingly, because the fluidity becomes higher in a state in which the concrete mixer truck applies pressure or vibrates, it is possible to improve pumping performance or consolidating performance.

Also, as a chemical agent, the air entraining agent (AE agent) or the alginate foaming agent prevents the high-fluidity high performance concrete 120 from being attached to a wall surface inside a pumping pipe and improves the pumping performance during pumping of the high-fluidity high performance concrete 120, thereby improving pumping performance such that an injection pressure is reduced or an injection speed is increased.

Also, a method in which the thickener, the air entraining agent (AE agent), or the alginate foaming agent is mixed after being added to a mixer together with other materials when manufacturing the high-fluidity high performance concrete 120 may be used, or a method in which the high-fluidity high performance concrete 120 is manufactured in advance and transported to the concrete mixer truck, which is the concrete casting apparatus 150, and then the thickener, the air entraining agent (AE agent), or the alginate foaming agent is added into the concrete casting apparatus 150 right before casting and mixed for 2 to 3 minutes may be used. Also, in a case in which vibrating consolidation is performed on high performance concrete which will be cast on a formwork, because the fluidity of the concrete is improved, it is possible to improve efficiency of the consolidation work.

[Method of Batch-Casting High-Fluidity High Performance Concrete and Low-Fluidity High Performance Concrete]

Figure 7:
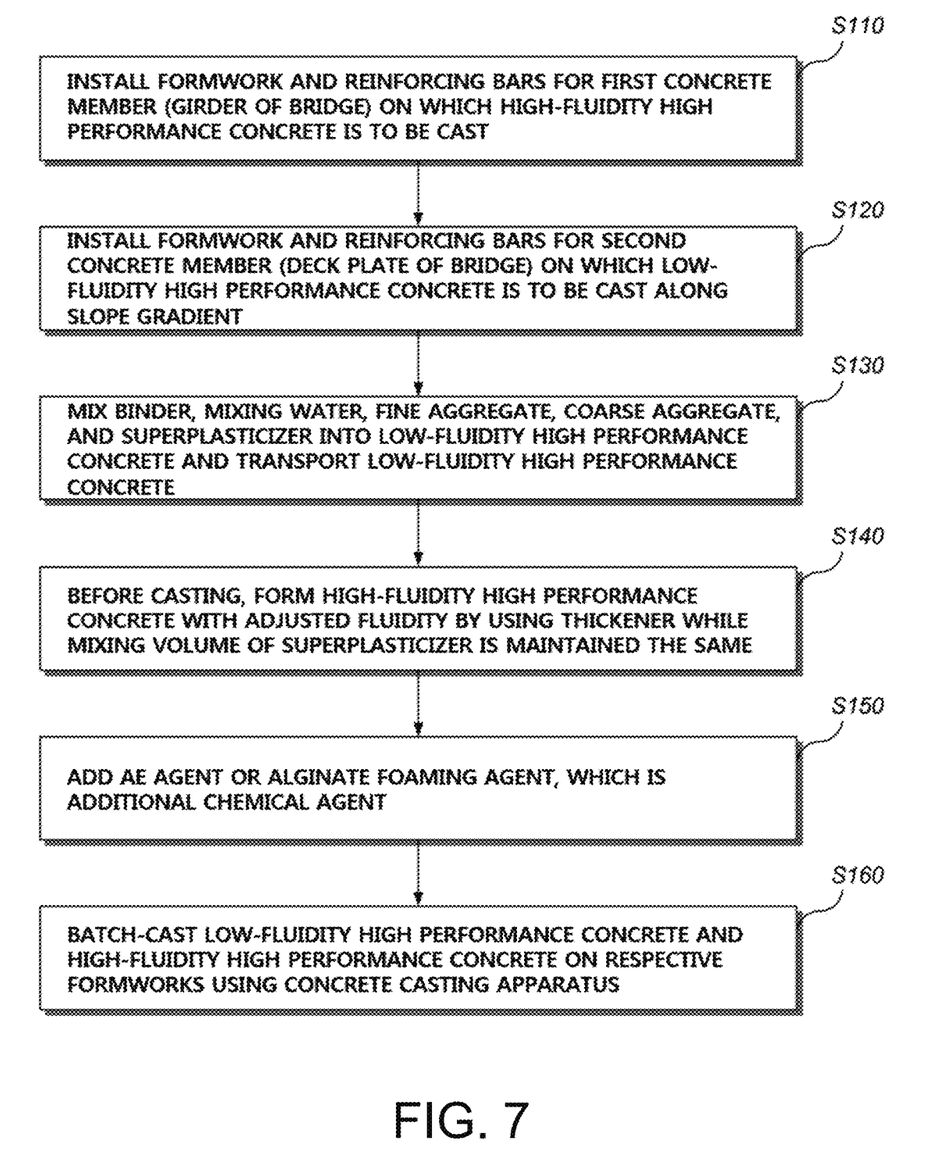
FIG. 7 is an operational flowchart of a method of batch-casting high-fluidity high performance concrete and low-fluidity high performance concrete according to an embodiment of the present invention.

FIG. 7 is an operational flowchart of a method of batch-casting high-fluidity high performance concrete and low-fluidity high performance concrete according to an embodiment of the present invention.

Referring to FIGS. 4 and 7, in the method of batch-casting the high-fluidity high performance concrete and the low-fluidity high performance concrete according to an embodiment of the present invention, first, a formwork and reinforcing bars for a first concrete member 110 on which high-fluidity high performance concrete 120 is to be cast are installed (S110). Also, a formwork and reinforcing bars for a second concrete member 130 on which low-fluidity high performance concrete 140 is to be cast along a slope gradient are installed (S120). Here, the first concrete member 110 may be a girder portion of the bridge and the second concrete member 130 may be a deck plate of the bridge that has the slope gradient, but the present invention is not limited thereto.

Next, binder, mixing water, fine aggregate, coarse aggregate, and superplasticizer are mixed into the low-fluidity high performance concrete 140 (S130).

Next, before casting of the concrete, the high-fluidity high performance concrete 120 with adjusted fluidity is formed by using a thickener while a mixing volume of the superplasticizer is maintained the same (S140). In this case, it is preferable that the thickener is used in an amount in a range of 0.005 to 5.0 wt % with respect to cement weight. For example, the thickener is a cellulose derivative thickener, a starch derivative thickener, or a sodium alginate thickener, and, in a case in which the thickener is added to the mix of the high-fluidity high performance concrete 120, the fluidity may be kept low while the concrete casting apparatus 150 is standstill or not vibrating, and the fluidity may become higher while the concrete casting apparatus 150 applies pressure or vibrates. In this way, it is possible to improve concrete pumping performance or concrete consolidation performance.

A mix proportion of the high-fluidity high performance concrete 120 is adjusted so that slump flow is in a range of 600 to 850 mm, and a mix proportion of the low-fluidity high performance concrete 140 is adjusted so that slump flow is in a range of 300 to 500 mm. Even when fluidities of the high-fluidity high performance concrete 120 and the low-fluidity high performance concrete 140 are different, hydration reaction times thereof are adjusted to be the same so that shrinkage behaviors thereof during a hydration reaction become the same.

Next, an additional chemical agent is added to the high-fluidity high performance concrete 120 (S150). In this case, it is preferable that the additional chemical agent is used in an amount in a range of 0.001 to 0.05 wt % with respect to the cement weight. For example, the additional chemical agent may be an air entraining agent (AE agent) or an alginate foaming agent and prevent concrete from being attached to a wall surface inside a pumping pipe during pumping of the concrete, thereby improving pumping performance such that an injection pressure is reduced or an injection speed is increased.

Also, the thickener and the additional chemical agent may be mixed together with other constituent materials by a mixer when manufacturing high performance concrete.

Alternatively, the low-fluidity high performance concrete 140 may be manufactured and transported to a concrete mixer truck, which is a concrete casting apparatus 150, and then the thickener and the additional chemical agent may be injected into the concrete mixer truck right before casting and mixed for 2 to 3 minutes. In this case, the high-fluidity high performance concrete 120 has a characteristic in that it does not flow while the concrete casting apparatus 150 is standstill or not vibrating and flows when the concrete casting apparatus 150 applies a predetermined pressure or vibration.

Next, the low-fluidity high performance concrete 140 and the high-fluidity high performance concrete 120 are batch-cast on respective formworks using the concrete casting apparatus 150 (S160). Here, preferably, the low-fluidity high performance concrete 140 is cast so that a fluidity maintaining time and a hydration reaction time are the same as those of the high-fluidity high performance concrete 120. Also, preferably, vibrating consolidation is performed on the high-fluidity high performance concrete 120 to improve the fluidity thereof so that efficiency of consolidation work is improved.

According to the method of batch-casting the high-fluidity high performance concrete and the low-fluidity high performance concrete according to an embodiment of the present invention, for example, a bridge may be cast at once by casting the high-fluidity high performance concrete 120 up to a portion right below a deck plate of the bridge and casting the low-fluidity high performance concrete 140 on the deck plate portion of the bridge, which has a slope gradient, in order to apply high performance concrete to a bridge construction site.

Consequently, according to an embodiment of the present invention, a bridge may be batch-cast in a case in which high-fluidity high performance concrete is cast up to a first concrete member, e.g., a girder portion of the bridge, and low-fluidity high performance concrete is cast on a second concrete member, e.g., a deck plate portion of the bridge that has a slope gradient. Accordingly, the construction cost can be reduced and the construction period can be shortened. In addition, because a cold joint does not occur, durability can be improved, and thus the life of the bridge can be increased.

According to an embodiment of the present invention, workability required for each of the high-fluidity high performance concrete and the low-fluidity high performance concrete can be secured by maintaining an amount of superplasticizer the same during the batch-casting of the high-fluidity high performance concrete and the low-fluidity high performance concrete.

According to the present invention, by using a thickener, e.g., a cellulose derivative thickener, a starch derivative thickener, or a sodium alginate thickener, in a mix of high-fluidity high performance concrete, whose fluidity is adjusted, required workability can be secured, and required slump flow can be controlled with the same hydration reaction time while pumping is not significantly affected. Also, by additionally using an air entraining agent (AE agent) or an alginate foaming agent in the mix of the high-fluidity high performance concrete, whose fluidity is adjusted, pumping performance may be improved such that an injection pressure is reduced or an injection speed is increased.

The above description of the present invention is merely illustrative, and those of ordinary skill in the art to which the present invention pertains should understand that the present invention may be easily modified to other specific forms without changing the technical idea or essential features of the present invention. Therefore, the embodiments described above should be understood as illustrative, instead of limiting, in all aspects. For example, each element described as one-body type may also be broken up into a plurality of elements, and, likewise, elements described as separate may also be combined into one body.

The scope of the present invention is defined in the claims below rather than the detailed description above. The meaning and scope of the claims and all changes or modifications derived from their equivalents should be interpreted as falling within the scope of the present invention.

The invention claimed is:

1. A method of batch-casting high-fluidity high performance concrete and low-fluidity high performance concrete, the method comprising:
   a) installing a formwork and reinforcing bars for a first concrete member (110) on which high-fluidity high performance concrete (120) is to be cast;
   b) installing a formwork and reinforcing bars for a second concrete member (130) on which low-fluidity high performance concrete (140) is to be cast along a slope gradient;
   c) mixing binder, mixing water, fine aggregate, coarse aggregate, and superplasticizer into the low-fluidity high performance concrete (140);
   d) before casting of the concrete, forming the high-fluidity high performance concrete (120) with adjusted fluidity by using a thickener while a mixing volume of the superplasticizer is maintained the same;
   e) adding an additional chemical agent to the high-fluidity high performance concrete (120); and
   f) batch-casting the low-fluidity high performance concrete (140) and the high-fluidity high performance concrete (120) on respective formworks,
   wherein the thickener is used in an amount in a range of 0.005 to 5.0 wt % with respect to cement weight, the additional chemical agent is used in an amount in a range of 0.001 to 0.05 wt % with respect to the cement weight, and the low-fluidity high performance concrete (140) is cast so that a fluidity maintaining time and a hydration reaction time are the same as those of the high-fluidity high performance concrete (120).

2. The method of claim 1, wherein:
   the high-fluidity high performance concrete (120) is used with a mix proportion adjusted so that slump flow is in a range of 600 to 850 mm, and the low-fluidity high performance concrete (140) is used with a mix proportion adjusted so that slump flow is in a range of 300 to 500 mm; and
   even when fluidities of the high-fluidity high performance concrete (120) and the low-fluidity high performance concrete (140) are different, hydration reaction times thereof are adjusted to be the same so that shrinkage behaviors thereof during a hydration reaction become the same.

3. The method of claim 1, wherein the thickener in Step d) is a cellulose derivative thickener, a starch derivative thickener, or a sodium alginate thickener, and, in a case in which the thickener is added to a mix of the high-fluidity high performance concrete (120), the fluidity is low while a concrete casting apparatus (150) is standstill or not vibrating and becomes higher in a state in which the concrete casting apparatus (150) applies pressure or vibrates so that concrete pumping performance or concrete consolidation performance is improved.

4. The method of claim 1, wherein the additional chemical agent in Step e) is an air entraining agent (AE agent) or an alginate foaming agent and prevents concrete from being attached to a wall surface inside a pumping pipe and improves pumping performance during pumping of the concrete so that an injection pressure is reduced or an injection speed is increased.

5. The method of claim 1, wherein vibrating consolidation is performed on the high-fluidity high performance concrete (120) so that the fluidity thereof is improved and efficiency of the consolidation work is improved.

6. The method of claim 1, wherein the first concrete member (110) is a girder portion of a bridge, and the second concrete member is a deck plate of the bridge that has the slope gradient.

7. The method of claim 6, wherein a bridge is cast at once by casting the high-fluidity high performance concrete (120) up to a portion right below the deck plate of the bridge and casting the low-fluidity high performance concrete (140) on the deck plate portion of the bridge, which has the slope gradient, in order to apply high performance concrete to a bridge construction site.

8. The method of claim 1, wherein the thickener in Step d) and the additional chemical agent in Step e) are mixed together with other constituent materials by a mixer when manufacturing high performance concrete, or the low-fluidity high performance concrete (140) is manufactured and transported to a concrete mixer truck, which is a concrete casting apparatus (150), and then the thickener and the additional chemical agent are injected into the concrete mixer truck right before casting and mixed for 2 to 3 minutes.

9. The method of claim 8, wherein the high-fluidity high performance concrete (120) has a characteristic in that it does not flow while the concrete casting apparatus (150) is standstill or not vibrating and flows when the concrete casting apparatus (150) applies a predetermined pressure or vibration.

* * * * *